Sept. 10, 1940.     P. BERNSTEIN     2,214,572
PRINTING TELEGRAPH MOTOR CONTROL METHOD AND APPARATUS
Filed April 25, 1939
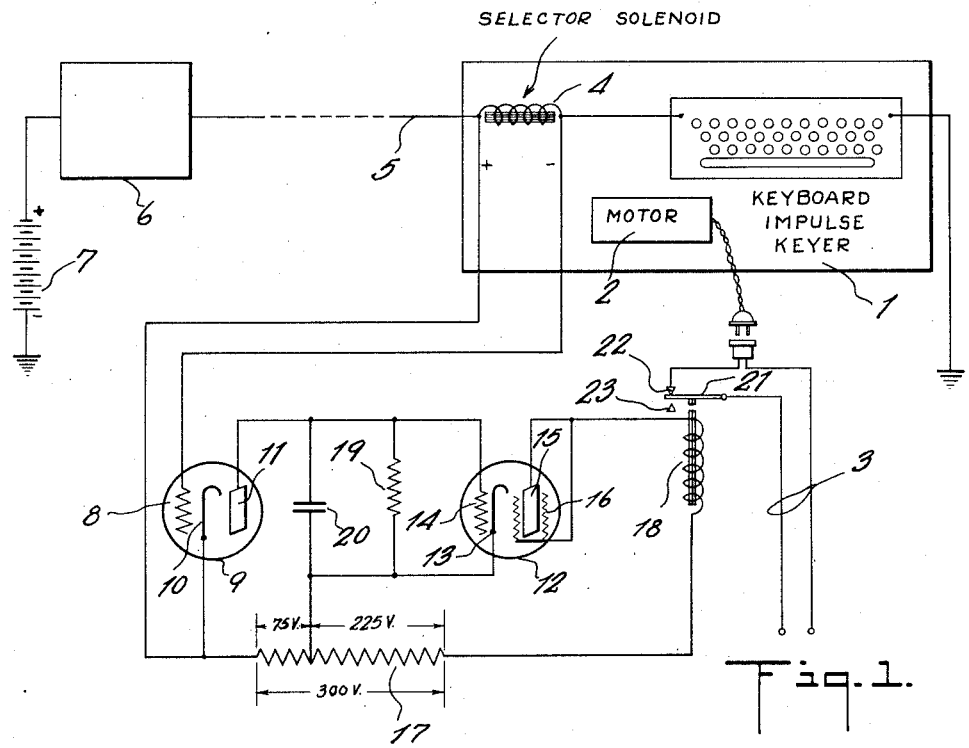
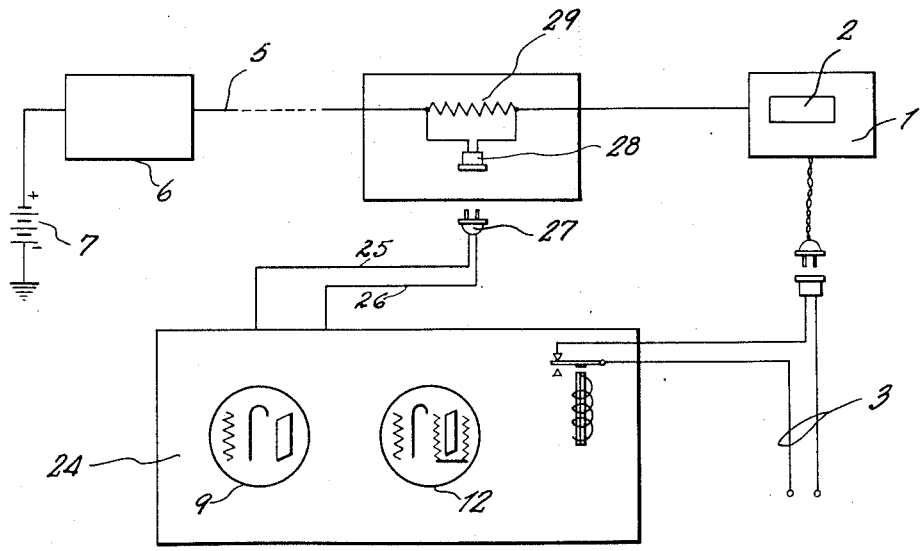
Philip Bernstein
INVENTOR
BY John J. Kogan
ATTORNEY Patented Sept. 10, 1940

2,214,572

UNITED STATES PATENT OFFICE 2,214,572

PRINTING TELEGRAPH MOTOR CONTROL METHOD AND APPARATUS

Philip Bernstein, Brooklyn, N. Y., assignor to Press Wireless, Inc., Chicago, Ill., a corporation of Delaware Application April 25, 1939, Serial No. 269,863

11 Claims. (Cl. 178—23)

This invention relates to motor control arrangements and more especially to arrangements for use in signalling systems such as printing telegraph systems and the like.

A principal object of the invention is to provide a novel and improved system for controlling the starting and stopping of the motor for driving a signal reproducing mechanism.

Another object is to provide a novel form of motor control which is rendered effective by received or transmitted intelligence signals.

A feature of the invention relates to a teleprinter system employing driving motors, wherein the telegraph signal channel is also used to control the starting and stopping of the motors by means of a novel electron tube control, thus eliminating the necessity of employing a separate motor control channel or line.

Another feature relates to a printing telegraph system wherein a printer motor is automatically started as soon as a keying impulse is received, and is automatically stopped a predetermined interval after the keying impulses have ceased.

A further feature relates to a novel motor control circuit employing a grid-controlled electron discharge tube, the bias of which is controlled by telegraph impulses.

A further feature relates to a motor control arrangement which may be plugged into a telegraph line to control automatically the starting and stopping of a printer motor by the line signals, and without making any special connections to the printer circuits or mechanism.

A further feature relates to the novel organization, arrangement and relative interconnection of parts which constitute a simple, efficient and novel motor control circuit for tele-printer systems and the like.

Other features and advantages not specifically enumerated will be apparent after a consideration of the following detailed descriptions and the appended claims.

While the invention will be described herein and illustrated in connection with a tele-printer or printing telegraph system, it will be understood that it is capable of application in any signalling system employing motors for driving the signal reproducing equipment.

Fig. 1 represents one embodiment of the invention.

Fig. 2 represents another embodiment of the invention.

Referring to Fig. 1, the numeral 1 represents any well-known form of printing telegraph machine which is adapted to print a message or other form of intelligence under control of received signalling impulses, for example code combinations of impulses. Such equipment is provided with a motor 2, for operating the various parts of the machine, and the motor is arranged to be operated from the local power supply mains 3. The mechanism of device 1, is controlled by a solenoid 4, which is energized under control of the signal impulses received from the signalling line 5, whereby the setting of the various selecting means of the machine is effected, thus operating the proper type bar or other reproducing element in accordance with each code combination of received signal impulses. It will be understood, of course, that associated with the signal responsive solenoid 4, is any well-known system of mechanical or electromagnetic selecting means, and merely by way of example, reference may be had to U. S. Patent No. 1,595,472.

There is shown diagrammatically in the drawing a transmitting machine 6, which may be located at a distant point and connected by the signalling line 5 to the receiving machine 1. Merely for explanatory purposes, there is shown a source of power 7 in the form of a battery which is connected to the line 5 under control of the code signalling mechanism of machine 6, whereby code combinations of impulses are impressed upon line 5. As an example of one transmitting machine that may be used, reference may be had to Patent No. 1,595,472.

Preferably the transmitter is arranged so that normally a current flows over line 5 to energize solenoid 4, the polarity of the current being such that the IR drop across solenoid 4 is sufficient to bias negatively the control grid 8 of electron discharge amplifier tube 9 to plate-current cut-off. Tube 9 may be of any well-known type for example a type 76 tube, and is schematically shown as a triode comprising the electron-emitting cathode 10, the control grid 8 and the anode 11. Tube 9 is coupled to another tube 12 for example a type 42 tube, comprising cathode 13, control grid 14, plate 15 and screen grid 16 which is connected to plate 15 causing the tube to act as a triode. The plate of tube 9 is directly coupled to the grid 14 of tube 12. For the purpose of supplying the proper operating voltages to the tubes 9 and 12, there is provided a source of steady potential of any suitable type which is connected across the voltage divider resistance 17, merely for illustration the source is shown as of 300 volts. The negative end of resistance 17 is connected to cathode 10 and the positive end is connected through an electromagnetic relay winding 18 to the plate 15. Plate 11 of tube 9 is connected through a resistor 19, for example of 1 megohm, to a suitable intermediate voltage tap, for example 75 volts, on the resistor 17. Resistor 19 is therefore common to the output circuit of tube 9 and to the input circuit of tube 12, and is shunted by a capacitor 20 of a predetermined capacity, for example 4 mfd. The relay winding 18 controls an armature 21 which is provided with a resting contact 22, whereby when winding 18 is deenergized, the circuit is closed from the power supply mains 3 to the motor 2. When the relay winding 18 is energized, the armature 21 engages its contact 22, whereby the circuit of motor 2 remains open.

When no keying impulses are received over line 5, the IR drop across solenoid 4, is of sufficient magnitude and polarity to bias the grid 8 negatively with respect to cathode 10 so that the plate current of tube 9 is at cut-off. Consequently, so long as no keying impulses are received over line 5, no plate current will flow through the resistor 19 and therefore, no bias will be applied to grid 14 of tube 12. Under this condition, plate current will flow through tube 15 of sufficient magnitude to energize the winding 18, maintaining armature 21 against its contact 23, whereby the circuit of motor 2 is broken. As soon as a keying impulse is applied to the line 5, either locally or from the transmitter 6, the current through solenoid 4 will be broken into groups of impulses such as code combinations of impulses and during each break, current will cease to flow through the solenoid 4. As soon as a breaking impulse occurs, the voltage across solenoid 4 is removed and the negative bias on control grid 8 ceases to exist. As a result, tube 9 draws plate current which flows through resistor 19. The IR drop across resistor 19 charges the condenser 20, resulting in the application of a negative bias to control grid 14 of sufficient magnitude to cut off the plate current of tube 12. As soon as the plate current of tube 12 ceases, relay winding 18 is deenergized thus closing the circuit to the printer motor 2 through contact 22.

When the breaking impulse ceases and current flows again through the solenoid 4, tube 9 will be again biassed to plate current cut-off. However, condenser 20 will slowly discharge through resistor 19 and will continue to apply negative bias to tube 12 until the condenser charge has completely leaked off. During the interval that condenser 20 is discharging, sufficient negative bias is maintained on grid 14 to prevent the necessary energization of winding 18, with the result that motor 2 continues in operation. It will be understood of course, that the signalling impulses of the various code combinations are spaced sufficiently close in time that sufficient charge is maintained on condenser 20 to maintain motor 2 in operation. It is apparent therefore, that the receipt of each keying impulse will charge the condenser 20 anew and the printer motor 2 will remain in operation until a certain time interval after the keying impulses have ceased. This interval will of course be determined by the constants of the capacitor 20 and resistance 19. After the keying impulses have ceased for this predetermined interval, the negative bias on grid 14 is removed, causing relay 18 to reoperate its contacts to open the circuit of the motor 2. The motor 2 will therefore remain idle until a new keying impulse is received.

Various changes and modifications may be made in the particular circuit disclosed, without departing from the spirit and scope of the invention. Thus instead of employing the drop across the printer solenoid 4 to control the on and off bias of the tubes, a suitable resistance may be inserted in the signal line for the same purpose. Such an arrangement is schematically illustrated in Fig. 2, wherein the parts corresponding to those of Fig. 1, bear the same numerals.

In Fig. 2, the control unit is represented by rectangle 24 and the conductors 25, 26, which lead to the control grid and cathode of tube 9, are connected to a plug 27 which is adapted to be inserted in a receptacle 28 which has a resistance 29 connected across its contacts. Resistance 29 is of such a magnitude that the normal current flowing in line 5 produces sufficient IR drop to bias the control grid of tube 9 to plate current cut-off as above described. The remainder of Fig. 2 functions the same as Fig. 1. This arrangement has the advantage that no connections need be made to the control circuits of printer 1.

What I claim is:

1. In a telegraph system, a telegraph message signalling line, a printing telegraph machine including an operating motor, and means to control the automatic starting and stopping of said motor, the last-mentioned means including a pair of grid-controlled electron tubes, means responsive to the absence of message signals on said line to bias one of said tubes so that normally it is non-conductive, means responsive to the absence of message signals on said line to bias the other tube so that it is conductive, means effective in response to the initiation signals on the line to render the first tube conductive and the second tube non-conductive, the last-mentioned means being maintained effective so long as telegraph signals are being impressed on the line.

2. In a printing telegraph system, the telegraph message signaling line, a printing telegraph machine connected to said line including an operating motor, and means to control the automatic starting and stopping of said motor by telegraph signals, the last-mentioned means including a pair of grid-controlled electron tubes, means coupling the output of one tube to the input of the other tube, said tubes being normally biassed in opposite senses so that one is conductive while the other is non-conductive, and means effective in response to a signal impressed on said line to reverse the bias of said tubes, means to maintain the effectiveness of said last-mentioned means only so long as telegraph signals are being impressed on said line.

3. In a printing telegraph system, a signalling line, a signal reproducer including an operating motor, and means controlled by the signals on said line to control the automatic starting and stopping of said motor, the last-mentioned means including a pair of grid-controlled electron tubes, one of said tubes having its control grid normally biassed to plate current cut-off and the other normally biassed so as to pass plate current, and a condenser and charging means therefor controlled by a signal on the line for rendering the first tube conductive and the second tube non-conductive.

4. In a printing telegraph system, a signalling line, a printing telegraph machine including a motor for operating the same, a first grid-controlled electron tube, a second grid-controlled electron tube, a resistance in common to the output circuit of the first tube and the input circuit of the second tube, a condenser in shunt to said resistor, means to bias the first tube normally to plate current cut-off while allowing said second tube to pass plate current, and means responsive to the receipt of a break signal on the line for causing the first tube to pass plate current and for biassing the second tube to plate current cut-off.

5. In a printing telegraph system according to claim 4 in which said condenser and resistor are so proportioned that said second tube is maintained negatively biassed to plate current cut-off as long as signals are being transmitted over the line said negative bias being automatically removed a predetermined interval after signalling ceases.

6. In a printing telegraph system, a printing telegraph machine including a driving motor, a relay for completing a power circuit to said motor, a grid-controlled electron tube, a winding for said relay connected in the plate circuit of said tube, means effective when no signalling is taking place on the line to bias the grid of said tube so that plate current flows, and means responsive to a break signal on said line to bias the said grid to plate current cut-off whereby said relay closes the said motor circuit.

7. A system according to claim 6 in which the means for biassing the grid to plate current cut-off includes a condenser and resistance and another grid-controlled tube whose plate current charges said condenser in response to said break signal.

8. A system according to claim 6 in which the means for biassing said grid to plate current cut-off includes a parallel condenser and resistance combination and another grid-controlled tube whose plate current charges said condenser, said other tube being normally biassed to plate current cut-off.

9. A system according to claim 1 in which the means to bias said one of said tubes includes a resistance connected in the signalling line.

10. A system according to claim 1 in which the means to bias said one of said tubes includes the selector solenoid of the printer.

11. In combination, a telegraph line, a printing telegraph machine connected to said line and a motor control unit for said machine including a pair of grid-controlled tubes normally biassed in opposite senses under control of the line current, a plug-in connection from the input of said unit to a resistance in the line circuit, and a relay in the output of said unit having contacts for controlling the connection of a power line to said motor.

PHILIP BERNSTEIN.